June 4, 1963 W. PÜTZER 3,092,775

TELEVISION RECEIVER WITH ANCILLARY APPARATUS FOR RECEIVING FURTHER TELEVISION TRANSMISSIONS IN INITIALLY NOT PRESENT FREQUENCY BANDS

Filed Nov. 23, 1959

INVENTOR
W. PÜTZER

BY Frank R. Jifari
AGENT 3,092,775

TELEVISION RECEIVER WITH ANCILLARY APPARATUS FOR RECEIVING FURTHER TELEVISION TRANSMISSIONS IN INITIALLY NOT PRESENT FREQUENCY BANDS

Walter Pützer, Aachen, Germany, assignor to North American Philips Company, Inc., New York, N.Y., a corporation of Delaware Filed Nov. 23, 1959, Ser. No. 854,956
Claims priority, application Germany Dec. 23, 1958
2 Claims. (Cl. 325—461)

Figures 1, 2:
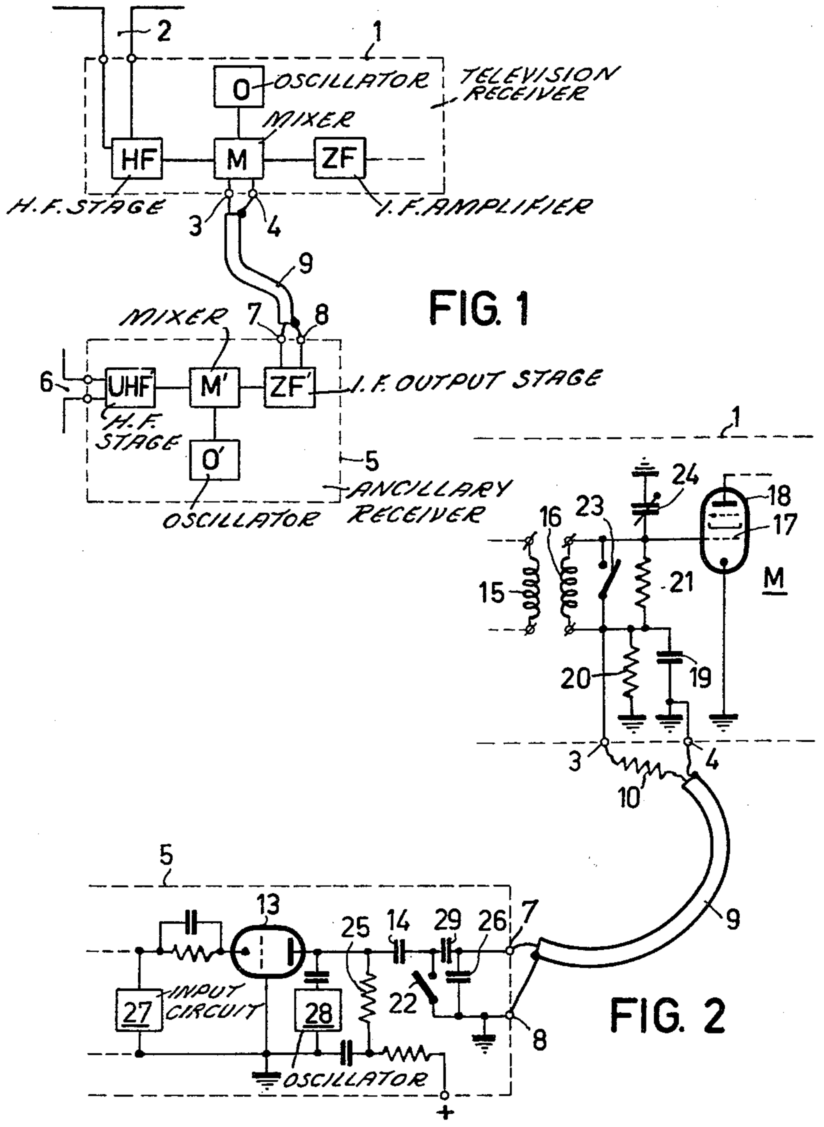

The present invention relates to television receivers with an auxiliary device for receiving further television transmissions in frequency bands initially not present in which the ancillary device and the television receiver operate according to the super-heterodyne principle and the intermediate-frequency produced in the ancillary apparatus after passing through a connection to the television receiver, is further amplified in the latter.

In order that present day television receivers may also be employed for receiving further television programmes, for example television programmes transmitted in the decimetre wave range, it is known to provide an ancillary device for decimetre wave reception and to supply the intermediate frequency obtained therein for further amplification through a co-axial cable to the television receiver. For this purpose this cable is matched, at the input and output, to its surge impedance by means of resonance transformers.

According to the invention, a considerable improvement of the coupling of the ancillary device to the television receiver (while doing away with the resonance transformer, considerable change-over equipment and special trimming in incorporating the ancillary device in the television receiver) is obtained by coupling the output terminals of the ancillary device through a lead to the input terminals of the mixing stage of the television receiver and by providing that this lead together with any additional reactances at the input and output terminals is resonant at a frequency corresponding to the intermediate frequency of the television receiver.

It is known to couple high-frequency disc-triodes for amplifying decimetre waves through a resonant connection. The resonant lead is fixedly connected to the disc-triodes thus jointly constituting an oscillatory system having to amplify only a particular frequency band during operation. In the present case, however, the connecting lead tuned to the intermediate-frequency resonance is coupled to the mixing stage of a television receiver which, when not using the ancillary device, has to handle widely diverging signal frequencies, the connecting lead remaining connected without troubling the operation of the television receiver.

In order that the invention may be readily carried into effect, an example will now be described in detail with reference to the accompanying drawings, in which FIG. 1 represents schematically the coupling of the ancillary device to the television receiver, and FIG. 2 shows the coupling stages separately.

In FIG. 1, the reference numeral 1 designates a schematically represented television receiver comprising inter-alia a high-frequency pre-stage HF, a mixing stage M, an oscillator O and an intermediate-frequency amplifier ZF. The other stages are not shown. The incoming oscillations are supplied via a dipole antenna 2 to the high-frequency stage HF. Input terminals 3 and 4 referred to hereinafter are connected to the mixing stage M.

FIG. 1 further represents schematically an ancillary device 5 comprising a high-frequency pre-stage UHF′ a mixing stage M′, an oscillator O′ and an intermediate-frequency output stage ZF′. The input oscillations of the additional television programmes are supplied via a dipole antenna 6 to the ancillary device 5. The intermediate-frequency output stage is connected to output terminals 7 and 8.

The ancillary device 5 and the television receiver 1 are connected together through terminals 3, 4, 7 and 8 via an interconnector 9 for example a co-axial cable. The intermediate frequency of the auxiliary device corresponds to that of the television receiver.

FIG. 2 shows further particulars of the circuit arrangement of one embodiment of the invention. A triode 13 with a schematically represented pre-circuit 27 and an oscillator circuit 28 operates in known manner in grounded grid arrangement as a mixer- and oscillator stage. The intermediate-frequency voltage applied to a resistor 25 appears via capacitors 14 and 29 at the output terminal 7. The other output terminal 8 is connected to ground.

The output terminals 7 and 8 are connected via an interconnector 9 and a damping resistor 10 to the input terminals 3, 4 of the mixing stage M which forms part of the channel selector of the television apparatus.

During operation of the television apparatus in the initially present frequency band the high-frequency signals of the high-frequency stage HF (not shown in this figure) of the channel selector are supplied to a coil 15, whence they are inductively passed to a coil 16.

The coils 15 and 16 are provided on insulating strips in the channel selector and are connected at will by means of a drum switch. The coil 16 is tuned by means of a trimmer 24. One end of the coil 16 is connected to the control grid 17 of the mixing tube 18, while its other end is connected to ground through a capacitor 19. This end is also connected to the input terminal 3 which is connected to ground through a resistor 20. The input terminal 4 is directly connected to ground. The reference numeral 21 designates a damping resistor shunting the coil 16. A direct voltage produced by grid-current, which voltage is measurable across the input terminals 3 and 4, is applied to the control grid 17 of the mixing tube 18 on correct operation of the oscillator O (not shown in this figure) of the television apparatus. The input terminals, of which the terminal not connected to ground is in general termed "measuring point" normally serve to check the operation of the oscillator in carrying out repairs of the television receiver. The aforesaid mixing stage M of a television apparatus is known per se.

According to the invention, the output terminals 7 and 8 of the ancillary device are connected to the input terminals 3 and 4 of the mixing stage M through an interconnector, for example Lecher wires or in the present case a coaxial cable 9. The interconnector 9 together with the reactances at the output terminals 7, 8 and the input terminals 3, 4 is resonant at a frequency corresponding to the intermediate frequency of the television apparatus.

During operation of the ancillary device, the coil 16 is short-circuited by the switch 23. In this case the input terminals of the aerial of the television apparatus are also short-circuited. This is preferably effected in such manner that the channel selector, in one position of the drum switch, has no insulating strip carrying tuning elements but possesses a contact strip effecting the required commutations. The contact strip may further comprise resistors which vary the supply of current to the oscillator tube in order to avoid overloading of the anode resistor when the oscillator is in operative.

In dimensioning the interconnector several factors should be considered to permit operation of the television apparatus without trouble and without being adversely affected. Across the interconnector which is invariably connected to the input terminals 3 and 4 even when the ancillary device is not used, an intermediate-frequency voltage is set up by the mixing grid current during operation of the television apparatus, by which intermediate-frequency voltage the pass-curves of the high-frequency circuits are liable to modification through the interconnector. In order to avoid this trouble the interconnector 9, when the ancillary device 5 is not employed is short-circuited by means of a switch 22 which is connected in parallel with the output terminals 7, 8 through a separating capacitor 29 of, say, 1500 pF, thus also modifying the intermediate-frequency resonance. The separating capacitor 29 prevents the grid bias of the mixing tube 18 from being short-circuited.

The short-circuited interconnector 9 is preferably so proportioned with regard to its length as to convert, at the low television channel frequencies, the short-circuit impedance at the input terminals 7, 8 of the ancillary device 5 into a no-load impedance at the input terminals 3, 4. The short-circuited interconnector is preferably proportioned so as to act, for example for the intermediate-frequency of the television channel 2 (51 mc./s.) as a tuned $\lambda/4$ lead so that at this frequency at the output terminals 3, 4 the transformed short-circuit impedance is a no-load impedance. The required length of the interconnector is calculated by means of formulae known from the conductor theory.

By this expedient, interferences through the coupled interconnector on receiving low television channel frequencies are avoided.

In proportioning the interconnector the capacitance at the input terminals 3 and 4 is also of importance.

In the form shown in FIG. 2, the capacitance set up at the input terminals 3 and 4 is made up of the trimmer capacitor 24, the capacitor 19, the grid-cathode capacity of the mixing tube 18 and the switching capacity; it has an overall value of approximately 60 pF.

A short-circuited lead, the length of which corresponds to one quarter wave length at 51 mc./s., is resonant in the intermediate-frequency range (33 to 39 mc./s.) when loaded by a capacitor of 60 pF at the output end, if its surge impedance is approximately 50Ω or less. In order to obtain a given detuning of the short-circulated lead form the intermediate frequency range, its surge impedance should be correlated to the reactance at the output end. In the present case, a surge impedance of 80 was chosen for a capacitative reactance of 60 pF. The interconnector had a length of 96.5 cms. with a permittivity $\epsilon=2.3$.

In order to tune the interconductor, during operation of the ancillary device, hence with open switch 22, to the intermediate frequency, a capacitor 26 was connected in parallel with the output terminals 7, 8. This capacitor had a value of 144 pF.

The damping resistor 10 avoids resonance points which might be annoying due to the short-circuited interconnector at higher television channel frequencies in the band III (175.25 to 256.15 mc./s).

In the present case, said damping resistance had a value of 15Ω. It appears transformed at the output terminals 7, 8 as a parallel resistance having a value of approximately 660Ω. In order to obtain the desired band-width, a resonance resistance of 480 ohms of the interconnector was required. This resistance was obtained by parallel-connection of the resistor 25 of 1800Ω.

As a result of the comparatively high capacitance at the input and the output of the interconnector, a television receiver comprising the ancillary apparatus need not be smoothed.

As an alternative, the interconnector may also be terminated inductively at the terminals 7 and 8. The required length of the lead is again calculated with the aid of formulae known from the conductor theory.

What is claimed is:

1. A signal receiver comprising means for receiving signals of a first frequency band, first mixer means for converting said signals of said first band to an intermediate frequency, means for receiving signals of a second frequency band, second mixer means for converting said signals of said second band to said intermediate frequency, and means connecting the output of said second mixer means continuously to the input of said first mixer means, said first mixer means comprising an amplifying device having an input electrode, tuning coil means having one end connected to said input electrode, impedance means connecting the other end of said coil to a point of fixed potential, said connecting means comprising a first conductor means having one end connected to the other end of said coil, second conductor means having one end connected to said point, capacitor means connected between the other ends of said first and second conductor means, capacitor means connecting the other end of said first conductor means to the output of said second mixer means, means connecting the other end of said second conductor means to said point of fixed potential, and switch means for connecting the output of said second mixer to said point of fixed potential, said conductor means being proportioned to transform the short-circuit of said switch means into a no-load impedance at said first mixer means at frequencies of said first band.

2. A signal receiver comprising means for receiving signals of a first frequency band, first mixer means for converting said signals of said first band to an intermediate frequency, means for receiving signals of a second frequency band, second mixer means for converting said signals of said second band to said intermediate frequency, and means connecting the output of said second mixer means continuously to the input of said first mixer means, said connecting means comprising conductor means having one end connected to said input of said first mixer means, and the other end connected to said output of said second mixer means, first reactance means connected to said one end, and second reactance means connected to said other end, the combination of said conductor means and first and second reactance means being resonant at said intermediate frequency, and means for selectively short circuiting said other end of said conductor means, said conductor means having a length substantially equal to $$\frac{\lambda}{4}$$

where $\lambda$ is the wavelength of said intermediate frequency, whereby the short circuit of said short circuiting means at said other end of said conductor means is transformed into a no-load at said one end of said conductor means for frequencies within said first frequency band.

References Cited in the file of this patent

UNITED STATES PATENTS

| | | |
|---|---|---|
| 2,186,455 | Goldmark | Jan. 9, 1940 |
| 2,628,312 | Peterson et al. | Feb. 10, 1953 |
| 2,665,377 | Krepps | Jan. 5, 1954 |
| 2,787,703 | Lubben | Apr. 2, 1957 |
| 2,873,360 | Lyman | Feb. 10, 1959 |

OTHER REFERENCES

Kennedy: "External R.F. Converters," Communications, November 1938, pages 26–28.